(12) United States Patent
Tu et al.

(10) Patent No.: US 11,099,095 B2
(45) Date of Patent: Aug. 24, 2021

(54) FLEXIBLE PRESSURE SENSOR AND FABRICATION METHOD THEREOF

(71) Applicant: ZHEJIANG OUREN New Materials Co., Ltd., Zhejiang (CN)

(72) Inventors: Daji Tu, Zhejiang (CN); Houjun Xia, Zhejiang (CN); Hua Pan, Zhejiang (CN); Xiaoming Yang, Zhejiang (CN)

(73) Assignee: Zhejiang Ouren New Materials Co., Ltd., Zhejiang (CN)

( * ) Notice: Subject to any disclaimer, the term of this patent is extended or adjusted under 35 U.S.C. 154(b) by 294 days.

(21) Appl. No.: 16/407,970

(22) Filed: May 9, 2019

(65) Prior Publication Data

US 2019/0353548 A1 Nov. 21, 2019

Related U.S. Application Data

(63) Continuation of application No. PCT/CN2018/105598, filed on Sep. 14, 2018.

(30) Foreign Application Priority Data

May 17, 2018 (CN) .......................... 201810486542.2

(51) Int. Cl.
*G01L 19/14* (2006.01)
*G01L 9/00* (2006.01)

(52) U.S. Cl.
CPC .......... *G01L 19/146* (2013.01); *G01L 9/0027* (2013.01)

(58) Field of Classification Search
USPC .................................................. 73/700–756
See application file for complete search history.

(56) References Cited

U.S. PATENT DOCUMENTS

2014/0090488 A1 4/2014 Taylor et al.
2016/0231098 A1* 8/2016 Otaka .................. G06F 3/0447
(Continued)

FOREIGN PATENT DOCUMENTS

CN 105865667 8/2016
CN 106017748 12/2016
(Continued)

OTHER PUBLICATIONS

International Search Report and Written Opinion of corresponding International application PCT/CN2018/105598, dated Jan. 30, 2019, with English translations.

*Primary Examiner* — Andre J Allen
(74) *Attorney, Agent, or Firm* — Leason Ellis LLP

(57) ABSTRACT

The present invention relates to a sensor, particularly a flexible pressure sensor and a fabrication method thereof. The invention provides a flexible pressure sensor which comprises a sensor body and electrodes. The sensor body comprises a first insulation layer of PET film, a first conductivity layer, an isolation layer, a second conductive layer and a second insulation layer of PET film from top to bottom, respectively. The electrodes are made from the first conductive layer and the second conductive layer connected with external circuit through any electrical wire. The isolation layer is a semi-conductive foamed polymer with adjustable conductivity/resistance. Both of the first insulation layer of PET film and the second insulation layer of PET film have the thickness of 4.5-120 μm with the surface resistance value of $10^{13-14}$. In the process method of the invention, the isolation layer is a foamed polymer with adjustable conductivity. When pressed, the isolation layer deforms, which reduces the resistance between the two electrodes and increases the conductivity. High sensitivity of the isolation layer meets the requirement that a tiny deformation is enough to have a large change in resistance. Hence, the (Continued)

pressure can be detected by computer data processing upon the relationship between any external pressure and related resistance value.

10 Claims, 1 Drawing Sheet

(56) References Cited

U.S. PATENT DOCUMENTS

| | | | | |
|---|---|---|---|---|
| 2017/0059434 A1* | 3/2017 | Li | ............... | G01L 9/0072 |
| 2017/0292886 A1* | 10/2017 | Vellaisamy | ............ | G01L 9/0098 |
| 2020/0042137 A1* | 2/2020 | Kano | ................ | G06F 3/0416 |
| 2020/0141818 A1* | 5/2020 | Bao | ................ | H01G 4/33 |

FOREIGN PATENT DOCUMENTS

| | | | |
|---|---|---|---|
| CN | 106197772 | | 12/2016 |
| CN | 106928723 | | 7/2017 |
| CN | 208780369 U | * | 4/2019 |
| CN | 209706990 U | * | 11/2019 |
| JP | 2007145960 | | 6/2007 |

* cited by examiner

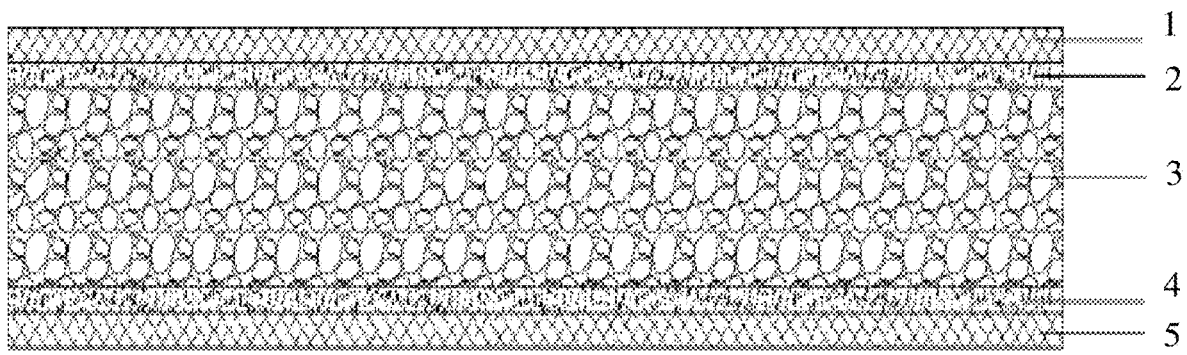

FLEXIBLE PRESSURE SENSOR AND FABRICATION METHOD THEREOF

FIELD OF THE INVENTION

The present invention relates to a sensor, particularly a flexible pressure sensor and fabrication method thereof.

BACKGROUND OF THE INVENTION

Flexible mechanical sensors can be mainly divided into resistive sensors, capacitive sensors and piezoelectric sensors. Flexible resistive sensors are mainly divided into strain type and piezoresistive type. Strain sensor mainly changes the resistance value by deforming the structure during the action of external force. The piezoresistive sensor mainly changes the resistivity of conductor under the action of external force, which results in the change of resistance value. Flexible capacitive sensor is usually of variable polar distance type. The capacitance varies with the distance between the plates. Usually a high elastic dielectric layer is chosen or the dielectric layer is micro-structured. The key to realize the capacitive sensor is to prepare good dielectric layer and tensile electrode material. Flexible piezoelectric sensor is a sensor based on piezoelectric effect and has piezoelectric effect. When the joint material is deformed, the mechanical energy is transformed into electrical energy, and the force is measured by measuring the change of charge. Polyvinylidene fluoride (PVDF) has good flexibility and high piezoelectric coefficient. It is often used in flexible piezoelectric pressure sensors.

For applications in flexible wearable equipment or clothing, high sensitivity is required. The working principle and application mode of the existing pressure sensors mentioned above are difficult to meet the requirements. In the prior art, PVDF or ZnO are commonly used for preparing piezoelectric thin films. Although these materials can realize the function of pressure sensing, their sensitivity is not very high due to the material characteristics, and they can not accurately identify the very weak strain. In addition, when these materials are used in the flexible wearable electronics industry, the high sensitivity under flexible conditions can not be achieved, and the stability is also poor.

Patent CN104359597A discloses a pressure sensor, which uses two layers of conductive material with inner surface covered with carbon nanotubes or graphene, which is assembled in staggered. When squeezed, the contact area of the two layers of surface changes, resulting in changes in resistance. However, in this process, two layers of conductive material need to be covered on a surface with certain morphology. The process is complex and difficult. Perfect implementation, and the sensitivity of measurement is affected by surface smoothness, but the precise control of surface smoothness is very difficult and high cost. Hence, it is difficult to apply in a large scale.

Patent CN106197772A discloses a pressure sensor comprising an induction layer, a lining layer, an isolation layer and an electrode. The isolation layer is located between the induction layer and the lining layer, is bonded with the induction layer and the lining layer, and the electrical contact between the induction layer and the lining layer is intermittently isolated. The surface of the induction layer has a first conductive layer, and the surface of the lining layer has a second conductive layer. The first conductive layer and the second conductive layer are both bonded with the isolation layer at the opposite position. The electrode is drawn from the first conductive layer or the second conductive layer and connected with the external circuit. The process is too complex to be applied on a large scale.

SUMMARY OF THE INVENTION

The present invention provides a flexible pressure sensor and fabrication method thereof in order to solve the above problems.

The invention provides a flexible pressure sensor which comprises a sensor body and electrodes. The sensor body comprises a first insulation layer of PET film, a first conductivity layer, an isolation layer, a second conductive layer and a second insulation layer of PET film from top to bottom, respectively. The electrodes are made from the first conductive layer and the second conductive layer and connected with external circuit through any electrical wire. The isolation layer is a conductive foamed polymer with adjustable conductivity. Both of the first insulation layer of PET film and the second insulation layer of PET film have the thickness of 4.5-120 μm with the surface resistance value of $10^{13-14}$.

Preferably, the isolation layer is a foamed polypropylene or a foamed polyurethane with a thickness of 400-600 μm.

Preferably, the average cell size of the isolation layer is about 8-15 microns, and the cell density is $0.8-1.5 \times 10^8/cm^3$. Under these conditions, the prepared flexible pressure sensor has high sensitivity under pressure.

Preferably, the foamed polyurethane comprises polytetramethylene ether glycol (PTMEG) of 60-90 by weight, polyoxypropylene triol of 10-30 by weight, catalyst of 1-2 by weight, foaming system of 2-3 by weight, prepolymerized MDI of 75-80 by weight, wherein the molecular weight of PTMEG is 1000-4000 and the OH value is 30-45 mgKOH/g, wherein the molecular weight of polyoxypropylene triol is 700-3000, wherein the prepolymerized MDI is 4-4-MDI prepolymerized with 12%-32% NCO. The foaming system comprises a foaming agent and a foaming stabilizer. The foaming agent and the foaming stabilizer are 3-5:1 by weight. The foaming agent is water and the foaming stabilizer is a mixture of p-cumylphenol polyethenoxy ether and sodium dodecyl sulfate. Preferably, p-cumylphenol polyethenoxy ether and sodium dodecyl sulfate are 5-6:1 by weight. The cell is unstable and big if only use water or mixture of water with p-cumylphenol polyethenoxy ether as foaming agent. If a small amount of sodium alkyl sulfate is added to it, a relatively uniform micro foam can be formed, but if the amount of sodium alkyl sulfate is added too much, although the foam is stable, it is easy to form a large foam. Under this foaming system, the polyurethane in the present invention can form a compact and uniform foam. The average pore size is about 10 μm, and the cell density reaches $1 \times 10^8/cm^3$, which makes a more stable testing performance and a higher sensitivity of the flexible pressure sensor.

Preferably, the first conductivity layer and the second conductivity layer are silver nanowire films.

Preferably, the silver nanowire films are formed with a thickness of 80-180 nm after dried from isopropanol solution which contains 0.3-1.5 wt % silver nanowires, This ratio is favorable for slit coating.

Preferably, the diameters of the silver nanowires are 20-150 nm.

The preparing method of the flexible pressure sensor includes following steps:

S1: The isolation layer is prepared by on-line micro-foaming of polymer.

S2: On the front of the isolation layer in step S1 is coated with nano-conductive materials using a slot die coating machine and formed into a first conductivity layer after dried.

S3: On the top of the first conductivity layer in step S2 is coated with PET thermal melt adhesive of 260-265° C. using slot die extrusion machine and formed into the first insulation layer of PET film after cooled to room temperature.

S4: On the back of the isolation layer in step S1 is coated with nanoconductive materials using a slot die and formed into a second conductivity layer after dried.

S5: On the top of the second conductivity layer in step S4 is coated with PET thermal melt adhesive of 260-265° C. using a slot die coating machine and formed into the second insulation layer of PET film after cooled to room temperature.

S6: A pair of electrodes is drawn from the conductive material of the first and second conductive layers, and solidified and packaged according to the required induction range.

The preferred drying method in both step 2 and 4 are wind drying.

Preferably, UV curable resin dispensing method is used for curing package in the said step 6.

The present invention has the following advantages compared with the prior art:

1: The invention provides a fabrication method of preparing the isolation layer which is a uniform foamed polymer and deformation occurred when subjected to pressure and leads a change in resistance between the two electrodes. A slight deformation is enough to have a large resistance change which achieves high sensitivity of the isolation layer and result in the values of pressure can be detected.

2: The structure of sensor in the invention can be flexible and applied to industries as wearable or e-skin, etc.

3: The invention can realize different sensitivity and testing range requirements of different sensors by adjusting the different foamed polymers, the morphology of the isolation layers and the square resistance between two electrodes.

4: The invention provides a foamed polyurethane with anti-yellowing and tight uniform foam, which leading the testing performance of the flexible pressure sensor is more stable.

5: The pressure sensor of the invention has realized the industrialization of flexible transparent conductive electrode with great flexibility, stretch-ability, high light transmittance and excellent conductivity by combining the reaction technology and the high precision roll-to-roll coating technology.

BRIEF DESCRIPTION OF THE DRAWING

FIG. 1 depicts an embodiment of the present flexible pressure sensor. The flexible pressure sensor includes:
1: first insulation layer of the PET film;
2: first conductivity layer;
3: isolation layer;
4: second conductivity layer; and
5: second insulation layer of the PET film.

DETAILED DESCRIPTION OF PREFERRED EMBODIMENTS

The following is a further explanation of the present invention in specific embodiments, but the following embodiments are only a further explanation of the present invention, which does not mean that the scope of protection of the present invention is limited to this, and all equivalent substitutions made according to the ideas of the present invention are within the scope of protection of the present invention Embodiment 1

S1: Polypropylene, maleic anhydride and composite foaming agent were used as main raw materials, with trace peroxide dibenzoyl as initiator, first crosslinking and granulating in twin-screw extruder, and finally extruding in single-screw extruder, then casting (casting temperature 180-200 C.), cooling to produce a 500-micron thickness isolation layer. The melting index of the polypropylene is 1.6-3.6 g/10 min.

S2: 0.3-1.5 wt % silver nanowires isopropanol solution is coated on the front surface of the isolation layer in step 1 by Slot-Die coating machine. After wind drying, the first conductive layer with thickness of 80-180 nm is formed, and the diameter of the silver nanowires is 20-150 nm.

S3: A PET hot melt adhesive is extruded at the temperature of 260-265° C. on the top of the first conductivity layer in step S2, and then the first insulation layer of PET film is formed with a thickness of 4.5-120 μm after cooled to room temperature.

S4: 0.3-1.5 wt % silver nanowires isopropanol solution is slit coated on the reverse side of the isolation layer in step 1 by a Slot-Die coating machine. After wind drying, a second conductive layer with thickness of 80-180 nm is formed. The diameter of the nanowires is 20-150 nm.

S5: A PET hot melt adhesive is extruded at the temperature of 260-265° C. on the top of the second conductivity layer in step S4, and then the second insulation layer of PET film is formed with a thickness of 4.5-120 μm after cooled to room temperature.

S6: A pair of electrodes is drawn from the conductive material of the first and second conductive layers, and solidified and packaged according to the required induction range.

The isolation layer is foamed polypropylene resin, the average cell size is about 8-15 micron, and the density is $0.8\text{-}1.5\times10^8/cm^3$. The deformation occurs when subjected to pressure, and then leads a change of the resistance between the two electrodes. A slight deformation is enough to have a large electrical resistance change which achieves high sensitivity of the isolation layer and result in the values of any pressure can be detected.

Embodiment 2

The foamed polyurethane comprises polytetramethylene ether glycol (PTMEG) of 60-90 by weight, polyoxypropylene triol of 10-30 by weight, catalyst of 1-2 by weight, foaming system of 2-3 by weight, prepolymerized MDI of 75-80 by weight, wherein the molecular weight of PTMEG is 1000-4000 and the OH value is 30-45 mgKOH/g, wherein the molecular weight of polyoxypropylene triol is 700-3000, wherein the prepolymerized MDI is 4-4-MDI prepolymerized with 12%-32% NCO. The additives comprise catalytic agent and foaming system. The foaming system comprises a foaming agent and a foaming stabilizer. The foaming agent and the foaming stabilizer are 3-5:1 by weight. The foaming agent is water and the foaming stabilizer is a mixture of p-cumylphenol polyethenoxy ether and sodium dodecyl sulfate. preferably, the p-cumylphenol polyethenoxy ether and sodium dodecyl sulfate are 5-6:1 by weight.

S1: The ingredients of preparing the foamed polyurethane are evenly mixed, coated on a release paper and dried through oven at 110° C. with the speed of 10-20 m/min, and then an isolation layer is formed with a thickness of 500 μm after cooled and released from the release paper.

S2: 0.3-1.5 wt % silver nanowires isopropanol solution is coated on the front surface of the isolation layer in step 1 by Slot-Die coating machine. After wind drying, the first conductive layer with thickness of 80-180 nm is formed, and the diameter of the silver nanowires is 20-150 nm S3: A PET hot melt adhesive is extruded at the temperature of 260-265° C. on the top of the first conductivity layer in step S2, and then the first insulation layer of PET film is formed with a thickness of 4.5-120 μm after cooled to room temperature.

S4: 0.3-1.5 wt % silver nanowires isopropanol solution is slit coated on the reverse side of the isolation layer in step 1 by a Slot-Die coating machine. After wind drying, a second conductive layer with thickness of 80-180 nm is formed. The diameter of the nanowires is 20-150 nm.

S5: A PET hot melt adhesive is extruded at the temperature of 260-265° C. on the top of the second conductivity layer in step S4, and then the second insulation layer of PET film is formed with a thickness of 4.5-120 μm after cooled to room temperature.

S6: A pair of electrodes is drawn from the conductive material of the first and second conductive layers, and solidified and packaged according to the required induction range.

The isolation layer is foamed polyurethane resin, the average cell size is about 8-15 micron, and the density is $0.8\text{-}1.5\times 10^8/cm^3$. The deformation occurs when subjected to pressure, and then leads a change of the resistance between the two electrodes. A slight deformation is enough to have a large electrical resistance change which achieves high sensitivity of the isolation layer and result in the values of any pressure can be detected.

Contrast 1

The foamed polyurethane comprises polytetramethylene ether glycol (PTMEG) of 60-90 by weight, polyoxypropylene triol of 10-30 by weight, catalytic agent of 1-2 by weight, water of 2-3 by weight, prepolymerized MDI of 75-80 by weight, wherein the molecular weight of PTMEG is 1000-4000; the OH value is 30-45 mgKOH/g, the molecular weight of polyoxypropylene triol is 700-3000; the prepolymerized MDI is prepolymerized 4-4-MDI with 12%-32% NCO; the foaming system comprises a foaming agent and a foaming stabilizer; the foaming agent and the foaming stabilizer are 3-5:1 by weight.

S1: The ingredients of preparing the foamed polyurethane are evenly mixed, coated on a release paper and dried through oven at 110° C. with the speed of 10-20 m/min, and then an isolation layer is formed with a thickness of 500 μm after cooled and released from the release paper.

S2: 0.3-1.5 wt % silver nanowires isopropanol solution is coated on the front surface of the isolation layer in step 1 by Slot-Die coating machine. After wind drying, the first conductive layer with thickness of 80-180 nm is formed, and the diameter of the silver nanowires is 20-150 nm S3: A PET hot melt adhesive is extruded at the temperature of 260-265° C. on the top of the first conductivity layer in step S2, and then the first insulation layer of PET film is formed with a thickness of 4.5-120 μm after cooled to room temperature.

S4: 0.3-1.5 wt % silver nanowires isopropanol solution is slit coated on the reverse side of the isolation layer in step 1 by a Slot-Die coating machine. After wind drying, a second conductive layer with thickness of 80-180 nm is formed. The diameter of the nanowires is 20-150 nm.

S5: A PET hot melt adhesive is extruded at the temperature of 260-265° C. on the top of the second conductivity layer in step S4, and then the second insulation layer of PET film is formed with a thickness of 4.5-120 μm after cooled to room temperature.

S6: A pair of electrodes is drawn from the conductive material of the first and second conductive layers, and solidified and packaged according to the required induction range.

The insulation layer is a foamed polyurethane resin with an uneven surface. Uniform deformations are not easily occurred when the insulation layer is subjected to pressure, thus the resistances change between the two electrodes are impossible to be measured.

Contrast 2

The foamed polyurethane comprises polytetramethylene ether glycol (PTMEG) of 60-90 by weight, polyoxypropylene triol of 10-30 by weight, catalytic agent of 1-2 by weight, water of 2.5 by weight, p-cumylphenol polyethenoxy ether of 0.5 by weight, prepolymerized MDI of 75-80 by weight, wherein the molecular weight of PTMEG is 1000-4000; the OH value is 30-45 mgKOH/g, the molecular weight of polyoxypropylene triol is 700-3000; the prepolymerized MDI is prepolymerized 4-4-MDI with 12%-32% NCO; the foaming system comprises a foaming agent and a foaming stabilizer; the foaming agent and the foaming stabilizer are 3-5:1 by weight.

S1: The ingredients of preparing the foamed polyurethane are evenly mixed, coated on a release paper and dried through oven at 110° C. with the speed of 10-20 m/min, and then an isolation layer is formed with a thickness of 500 μm after cooled and released from the release paper.

S2: 0.3-1.5 wt % silver nanowires isopropanol solution is coated on the front surface of the isolation layer in step 1 by Slot-Die coating machine. After wind drying, the first conductive layer with thickness of 80-180 nm is formed, and the diameter of the silver nanowires is 20-150 nm S3: A PET hot melt adhesive is extruded at the temperature of 260-265° C. on the top of the first conductivity layer in step S2, and then the first insulation layer of PET film is formed with a thickness of 4.5-120 μm after cooled to room temperature.

S4: 0.3-1.5 wt % silver nanowires isopropanol solution is slit coated on the reverse side of the isolation layer in step 1 by a Slot-Die coating machine. After wind drying, a second conductive layer with thickness of 80-180 nm is formed. The diameter of the nanowires is 20-150 nm.

S5: A PET hot melt adhesive is extruded at the temperature of 260-265° C. on the top of the second conductivity layer in step S4, and then the second insulation layer of PET film is formed with a thickness of 4.5-120 μm after cooled to room temperature.

S6: A pair of electrodes is drawn from the conductive material of the first and second conductive layers, and solidified and packaged according to the required induction range.

The insulation layer is a foamed polyurethane resin with an uneven surface. Uniform deformations are not easily occurred when the insulation layer is subjected to pressure, thus the resistances change between the two electrodes are impossible to be measured.

Contrast 3

The foamed polyurethane comprises polytetramethylene ether glycol (PTMEG) of 60-90 by weight, polyoxypropylene triol of 10-30 by weight, catalytic agent of 1-2 by weight, water of 2.5 by weight, p-cumylphenol polyethenoxy ether of 0.25 by weight, sodium dodecyl sulfate of 0.25 by weight, prepolymerized MDI of 75-80 by weight, wherein the molecular weight of PTMEG is 1000-4000; the OH value is 30-45 mgKOH/g, the molecular weight of polyoxypropylene triol is 700-3000; the prepolymerized MDI is prepolymerized 4-4-MDI with 12%-32% NCO; the foaming system comprises a foaming agent and a foaming stabilizer; the foaming agent and the foaming stabilizer are 3-5:1 by weight.

S1: The ingredients of preparing the foamed polyurethane are evenly mixed, coated on a release paper and dried through oven at 110° C. with the speed of 10-20 m/min, and then an isolation layer is formed with a thickness of 500 μm after cooled and released from the release paper.

S2: 0.3-1.5 wt % silver nanowires isopropanol solution is coated on the front surface of the isolation layer in step 1 by Slot-Die coating machine. After wind drying, the first conductive layer with thickness of 80-180 nm is formed, and the diameter of the silver nanowires is 20-150 nm S3: A PET hot melt adhesive is extruded at the temperature of 260-265° C. on the top of the first conductivity layer in step S2, and then the first insulation layer of PET film is formed with a thickness of 4.5-120 μm after cooled to room temperature.

S4: 0.3-1.5 wt % silver nanowires isopropanol solution is slit coated on the reverse side of the isolation layer in step 1 by a Slot-Die coating machine. After wind drying, a second conductive layer with thickness of 80-180 nm is formed. The diameter of the nanowires is 20-150 nm.

S5: A PET hot melt adhesive is extruded at the temperature of 260-265° C. on the top of the second conductivity layer in step S4, and then the second insulation layer of PET film is formed with a thickness of 4.5-120 μm after cooled to room temperature.

S6: A pair of electrodes is drawn from the conductive material of the first and second conductive layers, and solidified and packaged according to the required induction range.

The insulation layer is a foamed polyurethane resin with an uneven surface. Uniform deformations are not easily occurred when the insulation layer is subjected to pressure, thus the resistances change between the two electrodes are impossible to be measured.

What is claimed is:

1. A flexible pressure sensor which comprises a sensor body and electrodes;
    wherein the sensor body comprises a first insulation layer of PET film, a first conductive layer, an isolation layer, a second conductive layer and a second insulation layer of PET film,
    wherein the electrodes are connected to (i) the first conductive layer or the second conductive layer, and (ii) an external circuit,
    wherein the isolation layer is a semi-conductive foamed polymer with adjustable conductivity/resistance, and wherein the first insulation layer of PET film and the second insulation layer of PET film have the same thickness of 4.5-120 μm.

2. The flexible pressure sensor according to claim 1, wherein the isolation layer is foamed polypropylene or foamed polyurethane with a thickness of 400-600 μm.

3. The flexible pressure sensor according to claim 1, wherein the isolation layer has a compression deformation rate of 8-12%.

4. The flexible pressure sensor according to claim 2, wherein the foamed polyurethane comprises polytetramethylene ether glycol (PTMEG) of 60-90 by weight, polyoxypropylene triol of 10-30 by weight, catalytic agent of 1-2 by weight, foaming system of 2-3 by weight, prepolymerized MDI of 75-80 by weight, wherein the molecular weight of PTMEG is 1000-4000 and the OH value is 30-45 mgKOH/g, wherein the molecular weight of polyoxypropylene triol is 700-3000; wherein the prepolymerized MDI is prepolymerized 4-4-MDI with 12%-32% NCO; wherein the foaming system comprises a foaming agent and a foaming stabilizer;
    wherein the foaming agent and the foaming stabilizer are 3-5:1 by weight; wherein the foaming agent is water, wherein the foaming stabilizer is a mixture of p-cumylphenol polyethenoxy ether and sodium dodecyl sulfate; wherein the p-cumylphenol polyethenoxy ether and sodium dodecyl sulfate are 5-6: 1 by weight.

5. The flexible pressure sensor according to claim 1, wherein the first conductive layer and the second conductive layer are silver nanowire films.

6. The flexible pressure sensor according to claim 5, wherein the silver nanowire films have a thickness of 80-180 nm.

7. The flexible pressure sensor according to claim 5 wherein the silver nanowire films comprise silver nanowires having a diameter ranging from 20-150 nm.

8. A method of preparing the flexible pressure sensor according to claim 1, the method comprising:
    S1: preparing the isolation layer by micro-foaming of a polymer;
    S2: coating a first side of the isolation layer in step S1 with conductive materials to form the first conductive layer after drying;
    S3: coating a side of the first conductive layer in step S2 with PET hot melt adhesive at the temperature of 260-265° C. to form the first insulation layer of PET film after cooling to room temperature;
    S4: coating a second side of the isolation layer in step S1 with conductive materials to form the second conductive layer after drying;
    S5: coating a side of the second conductive layer in step S4 with PET hot melt adhesive at the temperature of 260-265° C. to form the second insulation layer of PET film after cooling to room temperature;
    S6: connecting a pair of electrodes to the conductive material of the first and second conductive layers which is then solidified.

9. The method according to claim 8, wherein the drying in steps S2 and S4 is wind drying.

10. The method according to claim 8, wherein in step S6 the solidifying uses a UV curing resin dispensing method.

* * * * *